United States Patent [19]

Matsumoto et al.

[11] 4,027,113
[45] May 31, 1977

[54] HEADPHONE

[75] Inventors: Toyosaku Matsumoto; Tokio Masui; Takao Nakaya, all of Hamamatsu, Japan

[73] Assignee: Nippon Gakki Seizo Kabushiki Kaisha, Shizuoka, Japan

[22] Filed: Sept. 10, 1975

[21] Appl. No.: 612,027

[30] Foreign Application Priority Data

Sept. 12, 1974 Japan .................... 49-109159[U]
Nov. 1, 1974 Japan .................... 49-132668[U]
Nov. 5, 1974 Japan .................... 49-133089[U]

[52] U.S. Cl. ............................................. 179/156 R
[51] Int. Cl.² ...................................... H04M 1/05
[58] Field of Search ............................... 179/156 R

[56] References Cited

UNITED STATES PATENTS

| 1,452,851 | 4/1923 | Schmidt | 179/156 R |
| 1,713,206 | 5/1929 | Young et al. | 179/156 R |
| 3,447,160 | 6/1969 | Teder | 179/156 R X |
| 3,579,640 | 5/1971 | Beguin et al. | 179/156 R X |

Primary Examiner—William C. Cooper
Attorney, Agent, or Firm—Cushman, Darby & Cushman

[57] ABSTRACT

A headphone comprising: two ear cups; a head band; and coupling means for rotatably coupling the ear cups to the head band, the ear cups having ear pads on those sides facing each other, respectively, the head band being positioned on that side of each of the ear cups away from the side where the ear pad is provided, said coupling means rotatably coupling the head band to that side of each of the ear cups located away from the side where the ear pad is provided, whereby the coupling means enables each of the ear cups to make vertical and horizontal rotations relative to the ear of the user. This headphone insures free rotation of the ear cups in universal directions, and the rotation angle can be controlled as required. Moreover, the headphone as a whole can be provided in a compact size.

7 Claims, 23 Drawing Figures

HEADPHONE

BACKGROUND OF THE INVENTION a. Field of the invention

The present invention concerns a headphone, and more particularly, it relates to an attachment mechanism for connecting a head band to each ear cup of headphones.

b. Description of the prior art

In headphones, in general, it is required that the bodies of headphones fit well the ears of the user from the viewpoints such as the prevention of leakage of sounds and prevention of entry of ambient noises into the ears. In order to always secure headphones to meet these requirements, the conventional headphones are arranged so that the ear cups of the headphones are allowed to make swinging and pivotal movements, with a certain degree of play, relative to the head band.

Description of the conventional typical arrangement of the means for connecting the headphones to the head band will be made by referring to FIGS. 20 and 21. FIG. 20 shows diagrammatically a longitudinal sectional view of a known arrangement for the connection of a headphone ear cup 3 to a head band 1. Within a headphone casing 11 is received a speaker 5 via a plate 4 assigned for the attachment of the speaker. A ringlike ear pad 6 is mounted at the peripheral end edge of the headphone casing 11. The head band 1 has means, such as attachment fitting 2, for connecting two such headphone casings 11 and 11 which are spaced from each other. This means 2 for connecting a headphone casing 11 to the head band 1 includes a through-hole 2a so that the head band 1 is slidably received through this through-hole 2a. This through-hole 2a has tapered portions 2c and 2c which progressively converge as this through-hole 2a goes closer to the central portion 2b of the through-hole 2a. Thus, the tapered portions 2c and 2c which oppose each other form a flaring opening angle $\alpha$ relative to the central portion 2b. Within the range of this opening angle $\alpha$, the head band 1 is adapted to incline. The connecting means 2 is supported by a horizontal shaft 2d which extends from the headphone casing 11. In such a known headphone attachment mechanism as described above, the headphone casing 11 is allowed to make free pivotal and swinging movements for a given degree of angle relative to the head band 1 depending on the amount of play provided in the attachment fitting 2, i.e. depending on the degree of angle defined by the tapered portions 2c and 2c. However, in this arrangement, the supporting point of the play is located on the part of the head band 1, and besides, the radius of rotation as measured from the supporting point 2b up to the edge of the opening 2a of the ear cup 3 is considerably lengthy. Accordingly, the relative positions between the edge of the opening 2a and the ear of the user can undergo considerably great variations depending on the angle of rotation (pivotal and swinging movement) of the headphone casing 11. For this reason, there will arise handling inconvenience for both mounting and removal of the headphones onto and from the ears of the user. In addition, the head band 1 is held only at the central portion 2b of the attachment fitting 2. As a result, there is not obtained a sufficient strength or firmness for supporting the headphones onto the ears of the user.

FIG. 21 shows another example of the known arrangement of attachment mechanism of headphones which are provided with universal rotation device. In FIG. 21, an arcuate arm 7 is rotatably coupled by a pin 8 to the lower end portion 1a of a head band 1. The opposite end portions of this arcuate arm 7 are rotatably coupled via a pair of pins 9 and 9 to the side walls of a headphone casing 11. Such an attachment mechanism as described above is most widely employed at present. The ear cup is adapted to rotate about the pins 8 provided at the coupling points between the head band 1 and the arcuate arm 7, and also at the coupling points 9 provided between the arcuate arm 7 and the headphone casing 11. In a headphone having such a known attachment mechanism as described above, the points of rotation of both the ear cup and the head band 1 are supported by pins. Accordingly, it is difficult to control the rotational friction forces at such points. As a result, there will arise unavoidable inconveniences such that the headphone casing 11 will make rotation to an amount more than necessary during the adjustment operation when mounting ear cups to the ears of the user, and that at the time of manufacture an excessively great force is required for causing a rotation of the headphone casing 11 after it has been assembled. Furthermore, this known attachment mechanism is of the arrangement designed so that the headphone casing 11 is coupled to the head band 1 by means of an arcuate arm 7 which is positioned so as to surround approximately one half of the round circumference of the headphone casing 11. As a result, the headphone will unavoidably have to assume a large external configuration.

SUMMARY OF THE INVENTION

It is, therefore, an object of the present invention to provide a headphone which is arranged so that its casing can be rotated freely in universal directions and that the headphone can be rotated in a smooth manner and that the headphone can be provided in a very compact size.

Another object of the present invention is to provide a headphone which can eliminate an unnecessary amount of rotation of the headphone casing and which can accomplish this elimination in an easy manner.

Still another object of the present invention is to provide a headphone which allows an easy assembling thereof in a simplified manner.

These and other objects as well as the attendant conveniences of the present invention will become apparent by reading the following detailed description of the preferred embodiments when taken in conjunction with the accompanying drawings.

BRIEF DESCRIPTION OF THE DRAWINGS

FIGS. 13 through 15 are somewhat diagrammatic illustration of further modified examples of the attachment means for coupling the head band to the ear cup, embodying the present invention, in which:

FIG. 13 is a somewhat diagrammatic side elevation of the attachment means;

FIG. 14 is a somewhat diagrammatic sectional view taken along the line XIV—XIV in FIG. 13; and FIG. 15 is a somewhat diagrammatic side elevation of another modified example of the attachment means.

Like parts are indicated by like reference numerals throughout the drawings for the simplicity of explanation.

DETAILED DESCRIPTION OF THE PREFERRED EMBODIMENTS

Figure 1:
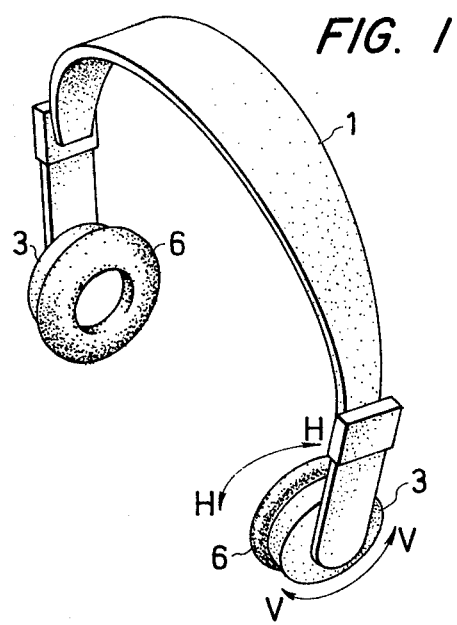
FIG. 1 is a somewhat diagrammatic perspective view of a headphone assembly to the present invention.

FIG. 1 shows an example of the headphone according to the present invention. This headphone, like those of this type of the prior art, is of the arrangement that two ear cups 3 and 3 are coupled to a head band 1.

The ear cup is coupled to the head band by a coupling means which will be described later. This coupling means is arranged so that it allows the ear cup 3 to make rotation in the directions following the peripheral edges of the ear of the user (i.e. rotation in the direction indicated by an arrow H) and also to make rotation in the directions crossing the first mentioned rotation (i.e. rotation in the directions indicated by an arrow V), whereby insuring the ear cup to fit any type of ear which may vary depending on the person.

Figure 5:
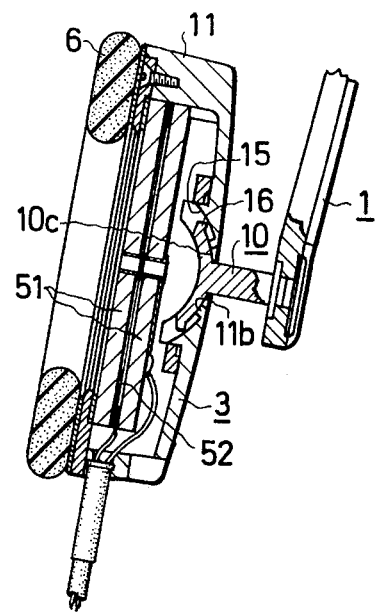
FIG. 5 is a somewhat diagrammatic vertical sectional view of a modified example of headphone embodying the present invention.

Each ear cup contains a driver unit therein. The driver unit is adapted to be electrically connected to an amplifier via a cable. As the driver unit, a loudspeaker which is compact in size is used widely. In this example, however, a driver unit as described below is employed. This driver unit is shown in FIG. 5. In a housing 11 which constitutes an ear cup 3 are provided two magnet plates 51 and 51 in a spaced relation relative to each other, and a diaphragm 52 is provided between these two magnet plates. This diaphragm 52 has its surface on which a coil made of a conductive metal foil is printed. This coil is connected to said amplifier via said cable. As a sound-carrying current is caused to flow through this coil, the diaphragm 52 will vibrate between the two magnet plates 51 and 51. The sound which is thus produced is passed through perforations which are formed through the magnet plates and is delivered to the outside of the ear cup through an opening provided on the opposite side thereof. An ear pad 6 is provided at the edge of this opening to seal the ear from ambient noises.

Figure 2:
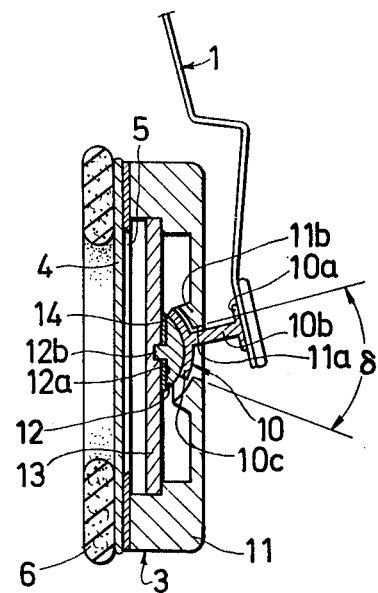
FIG. 2 is a somewhat diagrammatic vertical sectional view of one of the ear cups and its vicinity arrangement according to an example of the present invention.

FIG. 2 shows an example of the above-mentioned coupling means. This coupling means comprises a spherically headed member 10 which at one end is secured to a head band 1, and spherical seats 11b and 12 which are provided in the housing 11 of the headphone. This spherically headed member 10 has at its base a fixing portion 10a which is of a disc-like shape. One side of this fixing portion 10a is firmly bonded to the head band 1. A coupling rod 10b extends from the opposite surface of the fixing poriton 10a. A spherical head 10c is provided at the foremost end of said coupling rod 10b. This spherical head 10c is of two spherical surfaces i.e. convex and concave surfaces, both having a common center.

The ear cup 3 of headphone has an opening 11a through which is inserted said coupling rod 10b. This opening 11a is of a tapered funnel-like configuration which flares outwardly from the central portion on one side of a headphone housing 11 of the ear cup 3. On the inner side of the headphone housing 11 is provided a concave spherical seat 11b having the same common axis as for the opening 11a. This concave spherical seal 11b is arranged in slidable contact with the convex surface of the spherical head 10c of the spherically headed member 10. A convex spherical seat 12 which is generally indicated at 12 is of a convex spherical surface having the same center as for the concave spherical seat 11b. This convex spherical seat 12 is arranged to face said concave spherical seat 11b via a gap sufficient for slidably receiving the spherical head 10c of the spherically headed member 10 between itself 12 and said concave spherical seat 11b. This convex spherical seat 12 is limited of its position relative to the headphone housing 11 by arranging so that this seat 12 has a projection 12b extending from the central part of its bottom wall 12a and that this projection 12b is inserted into a hole formed in a base plate 13 so as to have a slightly larger diameter than that of said projection 12b, and furthermore that a spring member 14 such as a rubber sheet or a leaf spring is provided between the bottom wall 12a and said base plate 13. Also, the convex surface of the seat 12 is arranged to be slidably in contact with the concave reverse surface of the spherical head 10c to thereby slidably support the spherically headed member 10 between the seat 12 and the seat 11b. By appropriately selecting the spring member 14, it is possible to arbitrarily set the contact friction between the convex surface of the spherical head 10c, the concave spherical seat 11b and the convex spherical seat 12. This convex spherical seat 12 and said concave spherical seat 11b thus jointly form a spherical member-receiving space for slidably supporting said spherically headed member 10 therein. By these spherical elements and said spherically headed member-receiving space, the ear cup 3 is united to said head band 1 so as to be able to rotate in universal directions with an appropriate rotational friction.

The spherically headed member 10 is supported, as stated above, by the concave spherical seat 11b and the convex spherical seat 12. Accordingly, the spherically headed member 10 is allowed to make movements in universal directions relative to the headphone housing 11, i.e. the ear cup 3. In other words, the coupling rod 10b of the spherically headed member 10 is allowed to make free movements within the range of edge of the opening 11a of the headphone housing 11. The range of movement of this spherically headed member 10 is represented by a solid angle δ which is determined by the size of this opening 11a. As such, the spherically headed member 10 which is adapted to move in universal directions relative to the ear cup 3 is directly secured to the head band 1. Accordingly, the ear cup 3 itself is allowed to make movements in universal directions relative to the head band 1. Also, owing to the fact that the coupling portion between the ear cup 3 and the head band 1 is formed by the spherically headed member supporting structure which is comprised of the spherically headed member 10, the concave spherical seat 11b and the convex spherical seat 12, the ear cup 3 is allowed to rotate for an angle of 360° about the coupling rod 10b of the spherically headed member 10.

The spring member 14 causes the convex spherical seat 12 to apply a force to the spherical head 10c, with the base plate 13 serving as the supporting surface for the seat 12. As a result, the spherical head 10c will apply a force to the concave spherical seat 11b as a natural trend from the structure. As a result, the play friction force developed at the contact surface between the convex spherical seat 12 and the spherical head 10c, and the play friction force developed at the contact surface between the spherical head 10c and the concave spherical seat 11b can be selected to have appropriate values by the selection of said spring member 14. Also, the spherically headed member 10 and the spherical member-receiving space both of which jointly constitute the rotatable coupling portion of the ear cup 3 to the head band 1 are provided within the headphone housing 11, and thus the rotatable coupling of this housing 11 to the head band 1 is accomplished only by the coupling rod 10b. As a result, the external configuration of the ear cup 3 will be determined by the size of the headphone housing 11. Thus, a headphone which is compact in size and easy to handle can be obtained. Moreover, the spherically headed member 10 is supported by an arrangement designed for supporting the member 10 in the manner of slidable contact of the spherical surfaces, and this supporting is performed by the joint cooperation of the concave seat 11b and the convex seat 12. Therefore, there is obtained remarkably enhanced mechanical strength of the coupling portion. In addition, the coupling portion as a whole can be made integral with the ear cup 3. As a result, the headphone assembling work can be carried out with a markedly good efficiency.

On the other hand, in a known headphone, the arrangement need not have rotatability in all universal directions. Rather, in case the range of rotational directions are excessively wide, there would arise handling inconveniences such as by the entanglement of the cords. Therefore, it would be appropriate to allow the rotation to be performed within a given range of angle. As such, the solid angle δ which represents the range of movement of the spherically headed member 10 relative to the headphone housing 11 shown in FIG. 2 should, desirably, be limited to 30° when handling convenience is taken into consideration. This limitation can be determined by the size of the opening 11a which is provided in the headphone housing 11. Also, the range of rotation of the headphone housing 11 relative to the coupling rod 10b of the spherically headed member 10 is arranged so that the headphone housing 11 is allowed to rotate freely through 360°. However, when handling convenience is taken into consideration, it will be desirable to limit the angle of rotation to about 40°. There will, nevertheless, arise a question on how to limit this angle of rotation without adversely affecting the free movement of headphone with respect to the aforesaid solid angle δ.

Figure 3:
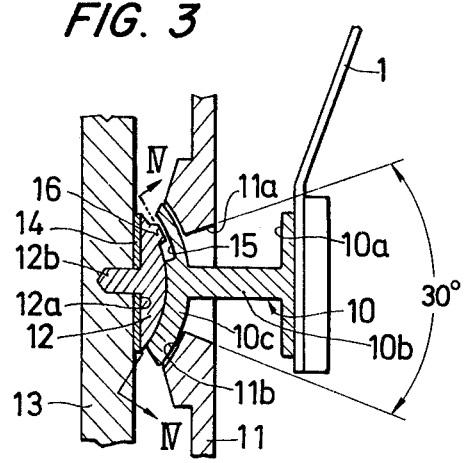
FIG. 3 is a modified example of the headphone arrangement shown in FIG. 2, and shows a somewhat diagrammatic vertical sectional view, on an enlarged scale, of the portion of coupling between the head band and the ear cup.
Figure 4:
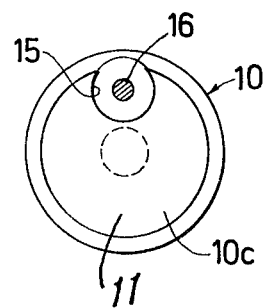
FIG. 4 is a cross sectional view taken along the line IV—IV in FIG. 3.

FIGS. 3 and 4 show such means of limiting the angle of rotation. The spherical head 10c of the spherically headed member 10 has, at the peripheral portion on the concave side thereof, a circular recess 15 which is formed by locally cutting out said peripheral portion. The convex spherical seat 12 which, together with the concave spherical seat 11b, supportingly receive the convex spherical head 10c has a projection 16 which extends from a peripheral site of the convex surface thereof. This projection 16 projects into the space located at the recessed portion 15 of the spherically headed member 10 and received therein. As the spherically headed member 10 is rotated, the spherical head 10c will slide in the space formed between the convex spherical seat 12 and the concave spherical seat 11b. When the spherically headed member 10 has made a rotation for a certain angle, the wall which is an element for forming the recess 15 of the spherical head 10c is brought into contact with the projection 16 which is provided on the convex spherical seat 12. Thus, the rotation of the spherically headed member 10 is limited. Since the recess 15 is of a circular recess shape, the rotatability of the spherically headed member 10 in universal directions is not hampered. Such a rotation-limiting means can limit the angle of rotation of the spherically headed member 10° to 40° while holding this member 10 at right angle relative to the headphone housing 11. By limiting the size of the opening 11a of the headphone housing 11, the solid angle δ of the spherically headed member 10 can be limited to 30°.

A headphone having the afore-mentioned rotation-limiting means is able to freely make movements in universal directions. In addition, its angle of rotation can be limited within an appropriate range without adversely affecting the directional universality. As a result, there can be avoided undesirably excessive free movements due to unnecessary broad directional universality. Thus, there is obtained a headphone which is most suitable from the viewpoints of use and handling.

The above-discussed rotation-limiting means may be comprised of a recess formed in the convex spherical seat 12 and a projection extending from the concave surface of the spherical head 10c of the spherically headed member 10, in a manner just the opposite of the above-mentioned construction.

Figure 5A:
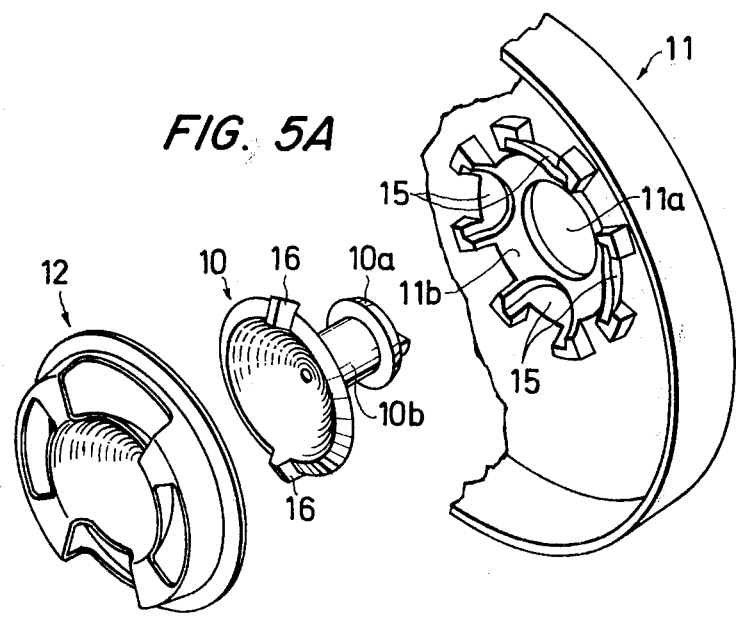
FIG. 5A is a diagrammatic exploded perspective view of same.

FIG. 5 and FIG. 5A show another example of coupling means having a control means for controlling the range of movement of the ear cup, as described above. The spherically headed member 10 is of a spherical head 10c. The spherical head 10c has two spherical surfaces which are formed to be concentric. On the other hand, in the housing 11 is provided a spherical seat 11b which is brought into slidable contact with one of the spherical surfaces of the spherical head 10c. A spherical seat 12 which is contained within the housing 11 is brought into contact with the other one of the spherical surfaces. By this arrangement, there is constructed a spherical universal joint.

A rod 10b extends from the central portion of the spherical head 10c. This rod 10b passes through an opening 11a which is formed through the central part of one side of the spherical seat 11b and extends to the outside of the housing 11. This rod 10b has its fixing flange 10a at the end of this extension. This fixing flange 10a is firmly bonded to the head band 1 at its side located away from the rod 10b.

The ear cup 3 is rotatable about the rod 10b of the coupling means. The ear cup 3 is also rotatable about an axis which is perpendicular to said rod 10b. Owing to the structure of the aforesaid spherical universal joint, the rotation of the ear cup about said axis which is perpendicular to the rod 10b is limited in its range, depending on the size of the opening 11a of the housing 11 and the diameter of the rod 10b. The rotation angle of the ear cup 3 about the rod 10b is limited by the arrangement which will be described below. The spherical head 10c has two projections 16 and 16 which extend from the peripheral edge of this spherical head 10c. On the other hand, on the peripheral edge of the spherical seat 11b, there are provided grooves 15 and 15 in which said projections 16 and 16 are received. The rotation of the ear cup 3 about the rod 10b, therefore, is limited by the angle which is determined by the width of these grooves 15 and 15.

Figure 6:
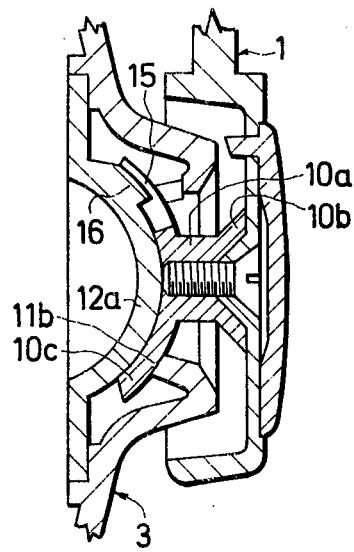
FIG. 6 is a somewhat diagrammatic vertical sectional view of further modified example of the headphone according to the present invention.
Figure 6A:
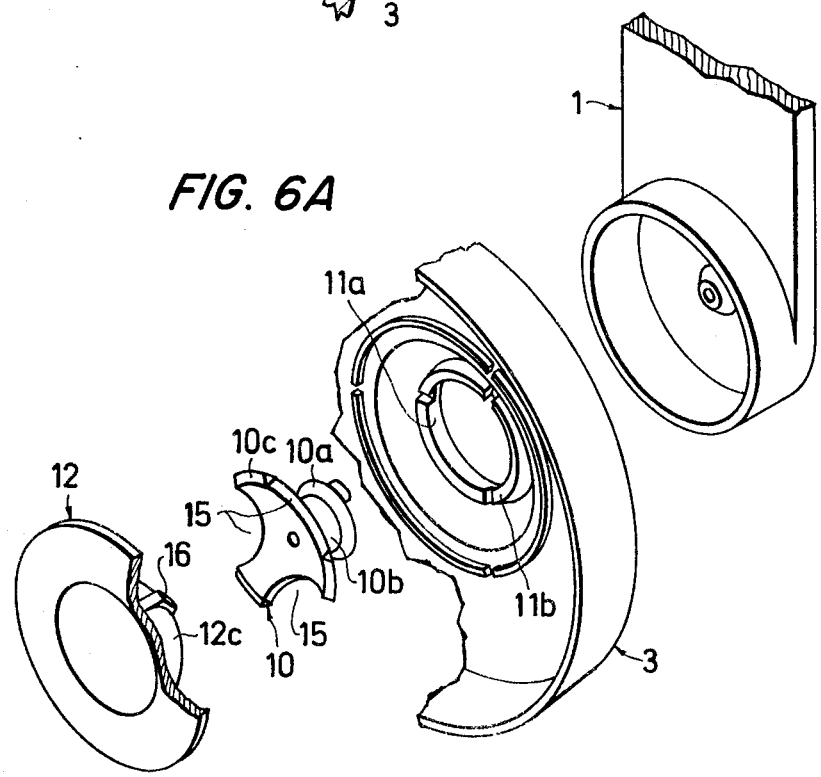
FIG. 6A is a diagrammatic exploded perspective view of the example shown in FIG. 6.

FIG. 6 and FIG. 6A show another example of the coupling means having such a spherical universal joint as described above. In this example, spherical head 10c has cut-outs 15. On the surface of the spherical seat 12 are provided projections 16 which engage in these cut-outs 15. By these projections and cut-outs, the rotation of the ear cup 3 in the direction of the arrow V as shown in FIG. 1 is limited.

In FIGS. 5, 5A, 6 and 6A, there are provided a plural number of means for limiting the rotation angle of the ear cup 3. Owing to this, it will be noted that, when the ear cup is rotated, there will not arise dislocation of the rotation center between the spherical head 10c and the spherical seat 11b. Accordingly, the ear cup 3 can be rotated extremely smoothly.

In the example described above, the spherically headed member 10 and the portion for receiving the spherical head 10c of this member 10 are arranged to lie within the headphone housing 11 to make the headphone itself into a compact size. Alternatively, however, the coupling portion may be arranged outside the headphone housing 11 so as to protrude therefrom, although the radius of rotation of the ear cup 3 will become a little longer.

The concave-convex surface relationship of the spherical seats and their associated head of the coupling rod may be arranged to be the opposite of the examples described above. More specifically, the convex spherical surface of the seat 12 may have a concave shape, and the concave spherical surface of the seat 11b may have a convex shape, and their associated surfaces of the spherical head 10c of the member 10 may have surface shapes which are the reverse of those shown and are complementary to the surface shapes of the members 11b and 10c.

Figure 7:
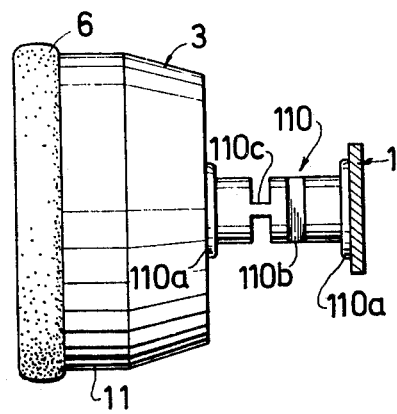
FIG. 7 is a somewhat diagrammatic plan view of one of the ear cups and its vicinity arrangement of a further example of headphone according to the present invention.
Figure 8:
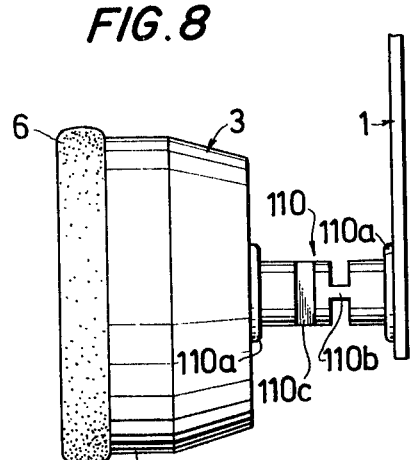
FIG. 8 is a somewhat diagrammatic front view of same.
Figure 9:
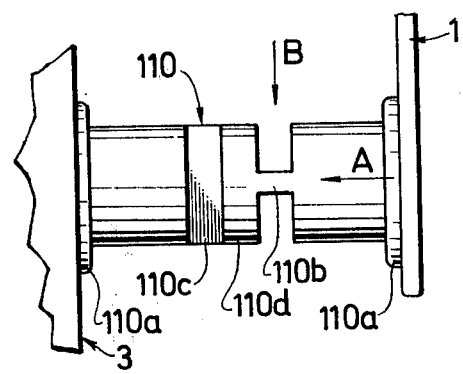
FIG. 9 is a front view, on an enlarged scale, of the coupling means shown in FIG. 8.

FIGS. 7, 8 and 9 show another example of the coupling fitting of the headphone embodying the present invention. A coupling rod 110 has its opposite ends 110a secured to a head band 1 and to the rear side of a headphone casing 11, respectively, said casing 11 containing therein a speaker or a vibration plate, said securing being performed by a bonding agent or screw or such fastening means. This coupling rod 110 is made with a flexible material such as polypropylene, polyethylene, vinyl chloride or acrylonitrile-butadienestyrene resin (ABS resin). This coupling rod 110 is provided with a horizontal thin bar member 110b and a vertical thin bar member 110c which are arranged at right angles relative to each other at a given interval therebetween, by cutting out portions of the coupling rod 110.

Such a coupling rod 110 will function in such a way that, when subjected to an urging force which is applied in the direction of the arrow A by the head band 1 as shown in FIG. 9, this urging force of the head band 1 is transmitted correctly to the ear cup 3. Also, when subjected to the urging force which is applied in the direction of the arrow B among the forces applied externally in radial directions in order to comply with the position, etc. of an ear of the user, the coupling rod 110 will easily bend at the horizontal thin bar member 110b. Similarly, to the urging force which is applied in the direction perpendicular to said radial direction, i.e. in the direction vertical to the sheet of the drawing, the vertical narrow bar member 110c will bend. Thus, the coupling rod 110 will not bend in its entirety, but only either one of these two horizontal and vertical thin bar members 110b and 110c which are provided on the coupling rod 110 will bend when subjected to a force applied thereto. Whereby, the headphone 3 is enabled to rotate in universal directions relative to the head band 1. It should be noted that the force of rotation which is required for the rotation of the headphone 3 depends on the compliance which is determined by the thicknesses and the lengths of the two separate thin bar members 110b and 110c which are provided in the coupling rod 110. In case it is intended to select this compliance, there is the necessity that this compliance be set at a sufficiently small value relative to the urging force exerted by the head band 1 and also to the friction force of the ear pad 6, since these two members will naturally develop restoring forces when they have been bent in any arbitrary directions. Furthermore, when there is made a large amount of rotation of the headphone, those portions of the coupling rod 110 which are located on both sides of the thin bar members 110b 110c will act to hamper such a great amount of rotation of the whole rod 110, so that the limitation of rotation will become possible.

A headphone having the above-mentioned structure is capable of rotating the ear cup 3 in universal directions, and in addition thereto, there can be obtained an appropriate force of rotation. In case the ear cup 3 detaches from an ear of the user at the time of mounting and removal of the headphone onto and from the ear, there will not develop an unnecessary rotation of the ear cup 3, nor there will occur entanglement of the cords. Moreover, the headphone can be provided in a much smaller size than the known headphone. Still further, the coupling rod can be molded as an integral single body, and this will markedly improve the assembling efficiency.

Figure 10:
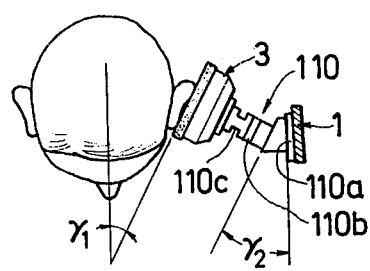
FIGS. 10 and 11 are a somewhat diagrammatic plan view and a front view, respectively, showing a further modified example of the present invention.
Figure 11:
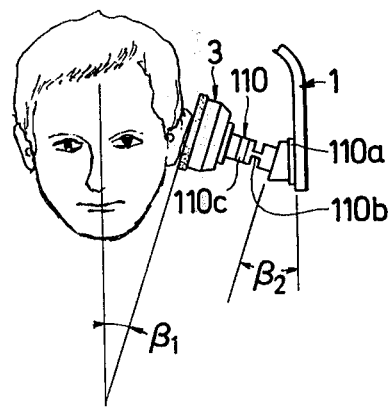

The headphone described above requires that, when the weight of this ear cup is substantially great, the compliance at the narrow bar members of the coupling rod be lowered, since when the compliance is great, the restoring forces of these members will be great, and there will be sensed a lack of naturalness in the mounting and removal of the headphone onto and from an ear of the user. FIGS. 10 and 11 show arrangements of the present invention which are designed by taking the matter concerning the adjustment of restoring forces of the two members into consideration. In FIGS. 10 and 11, like parts are indicated by like reference numerals. A fixing portion 110a of a coupling rod 110 located on the head band 1 side is inclined through such an angle at which the ear cup 3 is brought into contact with the user's (this angle represents a mean value of persons), i.e. through an angle $\beta2$ and an angle $\gamma2$ corresponding to the vertical inclination $\beta1$ and the horizontal inclination $\gamma1$ of the ear, respectively. By setting the vertical and horizontal planar angles $\beta2$ and $\gamma2$ which are assumed by the fixing portion of the coupling rod to the mean value of persons, the thin bar members 110b and 110c of the coupling rod 110 will not bend to an extreme extent, and thus there is obtained optimum conditions of use. In this example, the fixing portion is inclined for certain planar angles on the head band side. It should be understood, however, that the fixing portion may be inclined either on the ear cup side or at both of the ear cup side and the head band side.

Figure 12:
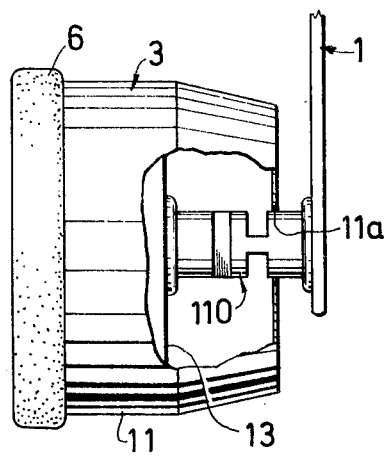
FIG. 12 is a somewhat diagrammatic front elevation, partly broken away, of a still further modified example of the headphone arrangement according to the present invention.

FIG. 12 shows a further example of headphone embodying the present invention. In this example, a coupling rod 110 which is made with a flexible material as that mentioned previously passes through an opening 11a which is provided at the central portion of the rear side of the headphone casing 11. One end of this coupling rod 110 is secured to the base plate 13 provided within the headphone casing 11. The other end of the coupling rod 110 is secured to a head band 1. According to this example, a portion of the coupling rod 110 is received within the ear cup 3, and thus the headphone as a whole can be provided in a further compact size, and there is obtained a further enhanced external good appearance.

Figure 13:
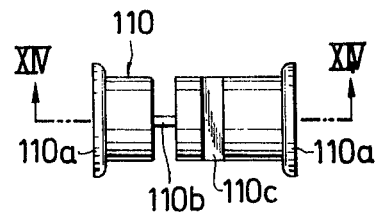
Figure 14:
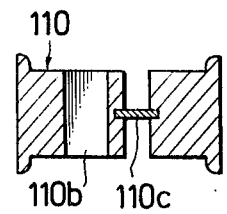

Description has been made on an example wherein the coupling rod 110 is made with a flexible material as an integral piece. It should be understood, however, that the coupling rod 110 may have thin bar members 110c and 110b made with pieces of a metal having a required compliance, and have the other portions of the rod made desirably with a material such as vinyl chloride from the viewpoint of processing, as shown in FIGS. 13 and 14. By arranging in this way, the coupling rod 110 will have an increased mechanical strength at the rotatable portions, i.e. the bendable portions.

In this example, description has been made on an instance wherein the coupling rod 110 has two spaced thin bar members 110c and 110b which are positioned at right angles relative to each other.

Figure 15:
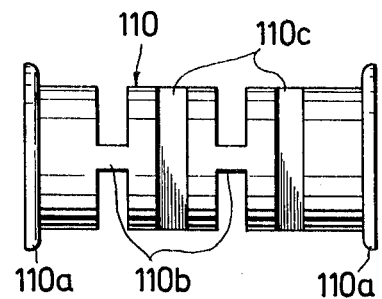

However, as shown in FIG. 15, there may be provided four thin bar members in the coupling rod 110. More specifically, horizontal thin bar members 110b, 110b and vertical thin bar members 110c, 110c are arranged in alternate fashion. It should be understood that the coupling rod 110 need to have two or more thin bar members, and that these thin bar members which may be vertical and horizontal are not required to be arranged in alternate fashion. It should be noted further that the vertical and horizontal thin bar members need not be arranged at exactly right angles relative to each other. They only need to be positioned at substantially right angles. The cross sectional shape of the coupling rod may be of oval, rectangular or any other desired shape, in addition to the circular one.

Figure 16:
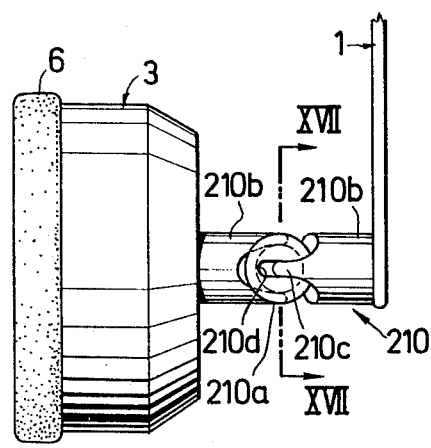
FIG. 16 is a somewhat diagrammatic front view of the ear cup and its vicinity arrangement, showing still another example of the present invention.
Figure 17:
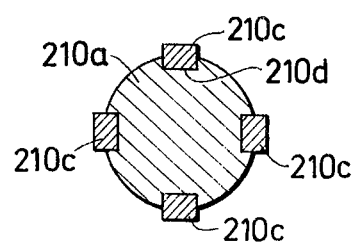
FIG. 17 is a somewhat diagrammatic cross sectional view, on an enlarged scale, taken along the line XVII—XVII in FIG. 16.

FIGS. 16 and 17 show still another modification of the coupling means for coupling the headphone casing to the head band, embodying the present invention. An ear cup 3 containing therein a driver element such as a speaker not shown is coupled to a head band 1 via a universal joint 210. This universal joint 210 has two shafts 210b and 210b which are fixed to the head band 1 and the ear cup 3, respectively. A ball or spherical member 210a is held at the free ends of these two coupling shafts 210b and 210b. This ball 210a has a diameter which is identical with that of said coupling shafts 210b and 210b, and has four grooves typically indicated at 210d which are formed on the surface thereof. These grooves 210d are arranged on the surface of the ball so as to be spaced from each other with the angle of 90° relatives to each other. On the other hand, at the free end of each of said two shafts 210b and 210b are provided a pair of arms 210c and 210c which are each slightly narrower than the width of the groove 210d and are formed as integral members of the shaft. The pair of arms 210c and 210c which are provided on the shaft on the ear cup 3 side are positioned at right angle relative to the pair of arms 210c and 210c of the shaft on the head band 1 side. These arms are slidably engaged in the grooves 210d of the ball 210a. Such a coupling means functions so that the ear cup 3 will be allowed to rotate in universal directions relative to the head band 1 about the ball 210a of the universal joint 210. It should be noted that even when the relative angle of the two coupling shafts 210b and 210b undergoes changes, the urging force exerted by the head band 1 is transmitted to the ear cup 3. Accordingly, the ear pad 6 can be brought into contact with the ear of the user, always with an appropriate pressure applied to the ear. In case a rotation occurs for an angle exceeding a certain degree, the two coupling shafts 210b and 210b will be brought into contact with each other, and thus no further rotation of the shaft will take place. Thus, it is possible to limit the rotation angle as required by varying the diameters of both the ball 210a and the two coupling shafts 210b and 210b.

Figure 18:
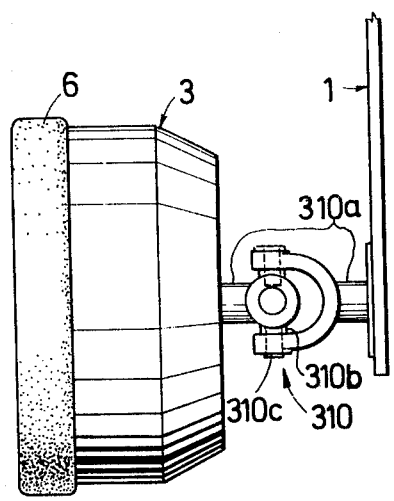
FIG. 18 is a somewhat diagrammatic illustration of a modification of the headphone arrangement shown in FIGS. 16 and 17 and shows a diagrammatic front view of the ear cup and its vicinity arrangement.

Fig. 18 shows another modification of such a coupling means as described above. In this example, the coupling means comprises a coupling shaft 310a which is fixed at one end to the head band 1 and a coupling shaft 310a which is fixed at one end to the ear cup 3, each of these coupling shafts being formed to be of a bifurcated shape. These two coupling shafts 310a and 310a are coupled together by an arm 310b of a crossbar shape and by a pin 310c to provide a universal joint 310.

Figure 19:
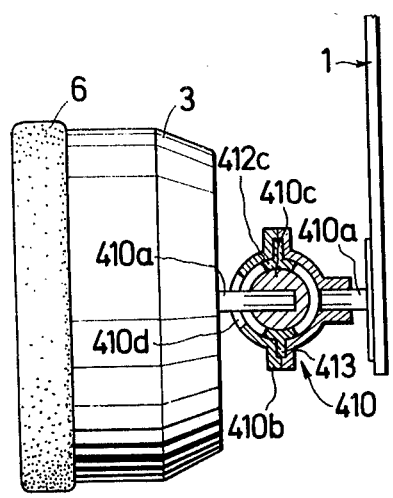
FIG. 19 is a somewhat diagrammatic front view of an essential part, shown in a vertical longitudinal section, in another modification.
Figure 20:
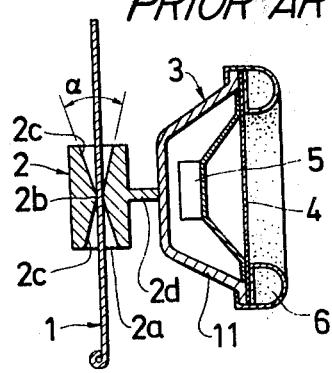
FIG. 20 is a somewhat diagrammatic vertical sectional view of one of the ear cups and its vicinity arrangement in a known headphone.
Figure 21:
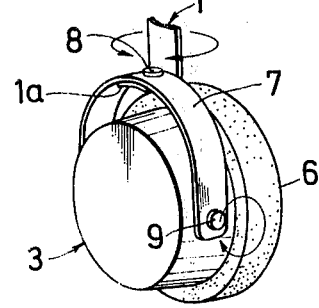
FIG. 21 is a somewhat diagrammatic perspective view of one of the ear cups and its vicinity arrangement in another known headphone.

FIG. 19 shows still another modification of the universal joint which constitutes a coupling means of the present invention. In this example, a coupling shaft 410a which is secured at one end to a head band 1 is fixed in a holder 410b. A shaft 410a having one end secured to an ear cup 3 is fixed to a ball 410c. A seat or socket 412c contained within the holder 410b rotatably holds the ball 410c. This seat 412c has pins 413. These pins 413 are received within the holder 410b and are fixed therein to thereby fix said seat 412c. The ear cup 3 is allowed to rotate through 360° about the shafts 410a. Also, the rotation of the ear cup 3 in the directions crossing this shaft 410a is adapted to be limited by an opening 410d which is formed in the holder 410b.

The examples shown in FIGS. 18 and 19 provide functions and advantages similar to those provided by the example shown in FIG. 16.

These two embodiments of the coupling means described above with respect to FIGS. 18 and 19 will function similar to that described previously.

The headphone having a coupling means such as shown in FIGS. 16 through 19 which enables the ear cup 3 to be rotated in universal directions relative to the head band, and moreover it enables the urging force of the head band to be transmitted to the ear cup of the headphone, so that the ear pad will be brought into contact with the ear of the user with an appropriate pressure always. Futhermore, the coupling portion is structured by the universal joint mechanism alone. Accordingly, the headphone as a whole can be provided in a compact size and can have a superior mechanical strength, and its assembling can be performed with an enhanced efficiency.

In the examples described above, the ear cups are mounted on both ends of a head band. It should be understood, however, that the present invention may be applied to a headphone having a single ear cup.

We claim:

1. A headphone comprising at least one ear cup, a head band, coupling means for coupling said ear cup to said head band, said ear cup having an ear pad on one side, said headband being positioned on that side of said ear cup away from the side where said ear pad is provided, said coupling means rotatably coupling said head band to that side of said ear cup located away from the side where the ear pad is provided, said coupling means enabling said ear cup to rotate vertically and horizontally relative to the ear of a user, said coupling means comprising a spherical surface headed member fixed at one end to said head band and a spherical surface headed member-receiving portion provided on the ear cup, said spherical surface headed member-receiving portion having a concave spherical seat and a convex spherical seat spaced from each other via a space formed in said receiving portion, said spherical surface headed member having a spherical portion having spherical surfaces associated with said respective spherical seats and being slidably held between these respective spherical seats, said spherical portion having a coupling rod portion extending therefrom and which is secured to said head band.

2. A headphone according to claim 1, in which: the respective spherical surfaces of the spherical portion of the spherical surface headed member and the respective spherical seats are concentric with each other; and said coupling rod portion passing through an opening formed through the concave spherical seat.

3. A headphone according to claim 2, in which: said convex spherical seat is secured to the ear cup on that side of this seat away from its spherical surface; and a spring means is provided between this convex spherical seat and said ear cup.

4. A headphone according to claim 3, further comprising:

means for limiting the rotation angle of said ear cup about the center of the spherical seats, said means being positioned between said spherical portion and the opposing convex spherical seat;

said limiting means comprising a projection provided on the spherical surface of one of said spherical portion and said convex spherical seat, and an engaging element provided on the spherical surface of the other one of these two members and arranged so as to confine said projection to a predetermined limit of movement and wherein said opening formed through the concave spherical seat is of a tapered configuration to limit the rotation of the ear cup in directions at right angles to the direction of its rotation about the ear of the user.

5. A headphone according to claim 4, in which: said projection is provided on the spherical surface of the convex spherical seat, and said engaging element is provided on that spherical surface of the spherical portion which is located opposite to said spherical surface of the convex spherical seat.

6. A headphone according to claim 4, in which: a plurality of engaging elements are provided on the concave spherical seat; and a plurality of projections are provided on that spherical surface of the spherical portion located opposite to the spherical surface of said seat.

7. A headphone according to claim 4, in which: a plurality of engaging elements are provided on the spherical portion and a plurality of projections are provided on the convex spherical seat.

* * * * *